Feb. 14, 1967  J. A. WEISS  3,304,519
HIGH FREQUENCY CIRCULATOR HAVING A PLURALITY OF
DIFFERENTIAL PHASE SHIFTERS AND
INTENTIONAL MISMATCH MEANS
Filed Feb. 21, 1964  2 Sheets-Sheet 1

INVENTOR.
JERALD A. WEISS
BY *Robert T Dunn*
ATTORNEY

INVENTOR.
JERALD A. WEISS
BY Robert T. Dunn
ATTORNEY

United States Patent Office 3,304,519
Patented Feb. 14, 1967

3,304,519
HIGH FREQUENCY CIRCULATOR HAVING A PLURALITY OF DIFFERENTIAL PHASE SHIFTERS AND INTENTIONAL MISMATCH MEANS
Jerald A. Weiss, Wayland, Mass., assignor to Massachusetts Institute of Technology, Cambridge, Mass., a corporation of Massachusetts
Filed Feb. 21, 1964, Ser. No. 346,474
10 Claims. (Cl. 333—1.1)

This invention relates to high frequency wave circulators and more particularly to a circulator including a plurality of wave transmission lines joined by wave conducting structure such that wave transmission between adjacent lines is nonreciprocal.

A typical high frequency wave circulator includes wave conducting structures defining three or four ports and interconnecting wave conducting structure such that wave transmission between adjacent ports in nonreciprocal. Heretofore, one form of circulator has included wave transmission lines defining each of the ports and joined at a common point at which a solid body of ferrite material is located. The ferrite is magnetized generally transverse to the direction of conduction of waves through the point and as a result, the transmission between adjacent ports is nonreciprocal, and, thus, the device performs as a circulator. The three transmission lines joined at the point may be waveguide, coax, or strip transmission line. Where waveguide is employed, it has been found convenient to locate a single solid block of ferrite material at the junction of the three waveguides which are joined with their axes lying in the same plane defining equal angles therebetween. Where coax or strip transmission lines are employed, two solid bodies of ferrite material are generally used, one on each side of the center conductor of the lines at the junction of the center conductors. In all these prior structures, the ferrite bodies are solid so that ferrite material is disposed immediately adjacent or at the geometric center of the junction of the three transmission lines. This limits the extent to which convection cooling can be employed to cool the ferrite which is heated considerably when the circulator is used at high microwave power levels. Heretofore, openings have not been provided in the ferrite bodies adjacent the geometric center of the junctions because it was deemed necessary that there be a bulk of ferrite material at this location in the path of the waves to cause the nonreciprocal wave transmission between the adjacent ports.

The bandwidth of operation of the symmertical multi-port circulators described has not been sufficiently broad for some applications. Therefore, it is one object of the present invention to provide a high frequency wave circulator for operation over a substantial bandwidth.

It is another object of the invention to provide a ferrite circulator so constructed that the portion of the ferrite body essential for operation is distributed immediately adjacent a surface of the ferrite body thereby eliminating the necessity of using a solid block of ferrite and facilitating cooling.

The present invention stems from the observation that broad band operation of a three port symmetrical ferrite circulator seems to occur when the electrical distance between ports is at least an appreciable fraction of a wavelength and that the coupling to the ports must involve internal reflections as a fundamental part of the circulator action. In the course of investigating this, I have viewed the circulator as a ring network in which the elements between each of the ports are nonreciprocal phase shifters and each of the ports defines a symmetrical T junction. Thus, the complete device is viewed as three symmetrical T junctions, with symmetrical arms of each of the junctions being joined by non-reciprocal phase shifters to form a ring. I have examined the nature of the reflections at the junctions to determine which parameters are significant and how they may be controlled to achieve optimum performance. As a result of this analysis, I have found that when the frequency dependence of the intrinsic reciprocal and nonreciprocal phases of the differential phase shifter is known, the characteristics of the T junctions required for broadband circulation may be completely determined. More particularly, I have found that the most advantageous circulator designs specified by the theory involve poorly matched (that is, intentionally mismatched) T junctions and that the required differential phase shift is quite small, typically about 10° in an advantageous case.

It is another object of the present invention to provide a differential phase shift, high frequency circulator in which the differential phase shift is substantially smaller than obtained heretofore.

It is another object of the present invention to provide such a circulator for operation at a given frequency having smaller overall dimensions than obtained heretofore.

It is one feature of the present invention to provide a high frequency wave circulator including a plurality of an intentionally mismatched T-junction which are joined by substantially identical differential phase shifters and in which each phase shifter includes separate bodies of ferrite material or in which all phase shifters include parts of the same ring shaped body of ferrite material.

It is another feature of the present invention to provide a circulator including a three port ring network formed by three substantially identical T junctions coupled together by three substantially identical differential phase shifters, the scattering coefficients of the T junction being related to the phase differential by a biquartic equation which yields a multitude of solutions that quantatively define the scattering coefficients and differential phase shift.

Other features and objects of the invention will be learned from the following specific description of embodiments taken in conjunction with the figures in which.

Figure 1:
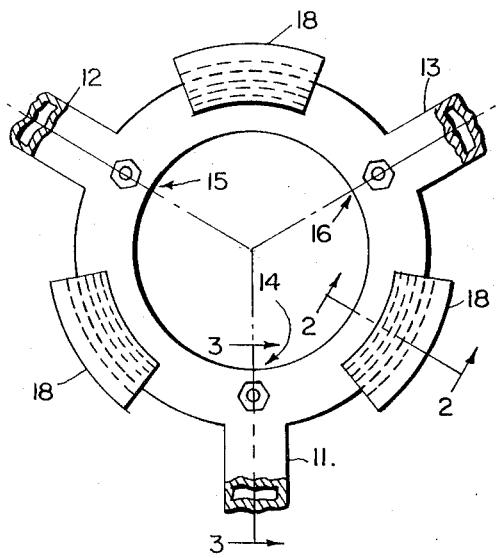
FIGURE 1 illustrates a three port ring network circulator incorporating features of the invention.
Figure 2:
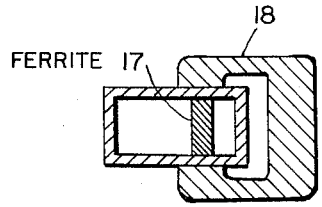
FIGURES 2 and 3 illustrate sectional views of the circulator shown in FIGURE 1.

Embodiments of the present invention include features discovered as the result of analysis of the network of the circulator. As already mentioned, the circulator network described herein follows from the observation that broad band circulation can occur only when the electrical distance between the ports are at least an appreciable fraction of a wavelength. The coupling to the three ports may be visualized as a local scattering and operation must involve internal reflections as a fundamental part of the circulator action. With these factors in mind, a model of the circulator is conceived as set forth in FIGURE 4 and includes three T junctions 1, 2, and 3, coupled together by differential phase shifters 4, 5, and 6. For purposes of the analysis, the junctions are considered to be identical electrically and the differential phase shifters are considered to be identical also. A typical one of the T junctions is illustrated electrically in FIGURES 5A and 5B and is ideally symmetrical. FIGURE 5A shows the effects of a wave of unit amplitude incident on one of the ports such as X, Y or Z referred to herein as an external port. FIGURE 5B shows the effects of a unit amplitude wave incident on one of the ports which connect to the phase shifters, referred to herein as an internal port. The derivation of the parameters shown in FIGURES 4, 5A and 5B and the relationships between the parameters follow the standard method set forth in the MIT Radiation Laboratory Series vol. 8 of the theory of group representations, but the results I have obtained fully cover the general case not found in standard treatments of the subject and so my results represent all physically realizable T junctions satisfying reciprocity, energy conservation, and T junction symmetry.

The differential phase shifters 4, 5 and 6 are considered to be identical to each other and are also considered to be matched and lossless. The scattering of each of these is represented by a reciprocal or average phase factor $\epsilon$ defined as follows:

$$\epsilon = e^{-\frac{1}{2}i(\phi_+ + \phi_-)}$$

and a non-reciprocal or differential phase factor $\delta$ expressed as follows:

$$\delta = e^{-\frac{1}{2}i(\phi_+ - \phi_-)}$$

In these equations, $\phi_+$ and $\phi_-$ refer to clockwise and counterclockwise propagation, respectively. The overall scattering of the network has been calculated in terms of the parameters of the identical T junctions 1, 2, and 3, and the identical differential phase shifters, 4, 5, and 6. I obtain expressions for the scattering coefficients $E_1$, $E_2$, $E_3$ which denote reflection, transmission and leakage respectively, of the overall network in response to an input signal launched into port X of the ring.

Having obtained expression for the scattering coefficients, $E_1$, $E_2$, and $E_3$, I then imposed conditions for perfect clockwise circulation of the wave launched into port X. The first of these conditions $E_1 = 0$, assumes a matched input and no energy flowing out of port X. The second condition, $E_3 = 0$, assumes perfect isolation so that no energy flows out of port Z. The third condition, $|E_2| = 1$ assumes completely lossless transmission so that all energy launched into port X flows out of port Y. These conditions are, obviously, not mutually independent and in fact the last condition implies the first two. I have found it convenient to employ the isolation condition, $E_3 = 0$ and solve for this condition to obtain a biquartic algebraic expression for the reciprocal phase factor $\epsilon$ and an expression for non-reciprocal phase factor $\delta$ in terms of $\epsilon$, both relations involving the scattering coefficients of the T's shown in FIGURE 5.

Having obtained the solution of the expression of scattering coefficients in terms of $\epsilon$ and $\delta$ I assigned values to the scattering coefficients to cover the range of physically realizable T junctions and solved for $\epsilon$ and $\delta$ corresponding to each of these sets. I found that not all of the physically realizable sets of T junction scattering coefficients will yield feasible values of $\epsilon$ and $\delta$. I further found that the scattering coefficients of suitable T junctions yielding generally desirable values of $\epsilon$ and $\delta$ describe poorly matched junctions. For this reason various embodiments of the invention include facility for adjusting the mismatching of each of the T junctions and in at least this respect the structures differ considerably from prior devices.

Figure 4:
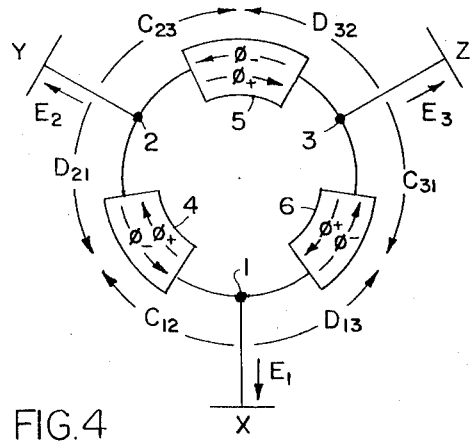
FIGURES 4, 5A and 5B are diagrammatical representations of the circulator shown in FIGURE 1 to illustrate electrical parameters involved.
Figure 5A:
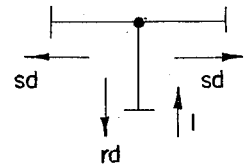
Figure 5B:
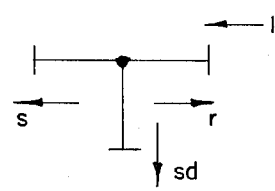

An analysis of the circuit representations in FIGURES 4 and 5 is included below. The parameters involved shown in these figures include waves $E_1$, $E_2$, and $E_3$ flowing out of the ports X, Y and Z respectively. A typical one of the T junctions 1, 2, and 3 is illustrated in FIGURE 5 to show the scattering coefficient parameters, $s$, $s_d$, $r$, and $r_d$. Each of these T junctions are symmetrical about the port X, Y, or Z and so the electrical coefficients $s$, $s_d$, $r$, and $r_d$ are not equal. The waves flowing in the ring circuit from each of the junctions 1, 2, and 3 are illustrated in FIGURE 4. These include transmitted waves composed of contributions from the original incident wave launched into port X and denoted C and reflection waves which result from the original incident wave and denoted D. Thus, $C_{12}$ flows from junction 1 to junction 2 and $D_{13}$ from junction 1 to junction 3. The total phase shift through each of the identical phase shifters 4, 5, and 6 in a clockwise direction is denoted $\phi_+$, while phase shift in a counterclockwise direction is denoted $\phi_-$. Thus the differential in phase shift is $\phi_+ - \phi_-$. Expressions for the C and D waves in terms of scattering coefficients and phase shift are as follows:

(1) $C_{12} = s_d + rD_{21}e^{-i\phi_-} + sC_{31}e^{-i\phi_+}$ (2) $C_{23} = rD_{32}e^{-i\phi_-} + sC e^{-i\phi_+}$ (3) $C_{31} = rD_{13}e^{-i\phi_-} + sC_{23}e^{-i\phi_+}$ (4) $D_{21} = rC_{12}e^{-i\phi_+} + sD_{32}e^{-i\phi_-}$ (5) $D_{32} = rC_{23}e^{-i\phi_+} + sD_{13}e^{-i\phi_-}$ (6) $D_{13} = s_d + rC_{31}e^{-i\phi_+} + sD_{21}e^{-i\phi_-}$ and $$e^{-i\phi_+} = e^{-\frac{1}{2}(\phi_+ + \phi_- + \phi_+ - \phi_-)}$$
$$= e^{-\frac{1}{2}i(\phi_+ + \phi_-)} \cdot e^{-\frac{1}{2}i(\phi_+ - \phi_-)}$$

likewise $$e^{-i\phi_-} = e^{-\frac{1}{2}i(\phi_+ + \phi_-)} \cdot e^{+\frac{1}{2}i(\phi_+ - \phi_-)}$$

For purposes of simplification, let;

(7) $\epsilon = e^{-\frac{1}{2}i(\phi_+ + \phi_-)}$ (8) $\delta = e^{-\frac{1}{2}i(\phi_+ - \phi_-)}$ (9) $\delta^* = e^{+\frac{1}{2}i(\phi_+ - \phi_-)}$ and

(10) $r\epsilon = R$

(11) $s\epsilon = S$

Substituting the expressions 7 to 11 in Equations 1 to 6, the following are obtained;

(12) $C_{12} = s_d + \delta^* R D_{21} + \delta S' C_{31}$

(13) $C_{23} = \delta^* R D_{32} + \delta S' C_{12}$

(14) $C_{31} = \delta^* R D_{13} + \delta S C_{23}$

(15) $D_{21} = \delta R C_{12} + \delta^* S D_{32}$

(16) $D_{32} = \delta R C_{23} + \delta^* S D_{13}$

(17) $D_{13} = s_d + \delta R C_{31} + \delta^* S D_{21}$

If a wave is launched into port X of junction 1, then the waves $E_1$, $E_2$, and $E_3$ are expressed as follows;

(18) $E_1 = r_d + s_d C_{31} e^{-i\phi_+} + s_d D_{21} e^{-i\phi_-}$

(19) $E_2 = s_d D_{12} e^{-i\phi_+} + s_d D_{32} e^{-i\phi_-}$

(20) $E_3 = s_d C_{23} e^{-i\phi_+} + s_d D_{13} e^{-i\phi_-}$

Equations 7 to 9 are substituted in the Equations 18 to 20 above, $E_1$, $E_2$, and $E_3$ become;

(21) $E_1 = r_d + \epsilon s_d (\delta C_{31} + \delta^* D_{21})$

(22) $E_2 = \epsilon s_d (\delta C_{12} + \delta^* D_{32})$

(23) $E_3 = \epsilon s_d (\delta C_{23} + \delta^* D_{13})$

The Equations 12 to 17 may be written in matrix form as follows;

(24)

$$\begin{bmatrix} \delta^* R & -1 & 0 & 0 & 0 & \delta S \\ -1 & \delta R & \delta^* S & 0 & 0 & 0 \\ 0 & \delta S & \delta^* R & -1 & 0 & 0 \\ 0 & 0 & -1 & \delta R & \delta^* S & 0 \\ 0 & 0 & 0 & \delta S & \delta^* R & -1 \\ \delta^* S & 0 & 0 & 0 & -1 & \delta R \end{bmatrix} \begin{bmatrix} D_{21} \\ C_{12} \\ D_{32} \\ C_{23} \\ D_{13} \\ C_{31} \end{bmatrix} = -s_d \begin{bmatrix} 1 \\ 0 \\ 0 \\ 0 \\ 0 \\ 1 \end{bmatrix}$$

The above matrix equation can be solved for $C_{12}$, $C_{23}$ and $C_{31}$ to yield the following:

(25)
$$C_{12} = -\frac{S_d}{\Delta}\{[R(R-S)(R^2-S^2-1) + (1-R^2)] + \delta^{*3}S^2(R-S)\}$$

(26)
$$C_{23} = -\frac{S_d}{\Delta}\{\delta^{*2}S[R-(R-S)^2(R+S)] - \delta S(R^2-RS-1)\}$$

(27)
$$C_{31} = -\frac{S_d}{\Delta}\{\delta^*[(R-S)^3(R+S)^2 - R(2R^2-RS-S^2-1) + \delta^2 S^2\}$$

Where

(28) $\Delta = (R^2-S^2)^3 - 3R^2(R^2-S^2-1) + (\delta^3+\delta^{*3})S^3 - 1$

As already shown $\delta$ and $\delta^*$ are conjugate parameters. It can be shown that the C and D parameters are related to each other somewhat as "conjugates" in that they can be converted by replacing $\delta$ with $\delta^*$ and vice versa. For example, $C_{12}$ and $D_{13}$, $C_{23}$ and $D_{32}$, and $C_{31}$ and $D_{21}$ are "conjugate" pairs in this respect. Thus, $D_{13}$, $D_{32}$, and $D_{21}$ can be written as the conjugates of $C_{12}$, $C_{23}$ and $C_{31}$ and these six quantities then substituted into the Equations 21 to 23 for $E_1$, $E_2$, and $E_3$. When this is done, it will be seen that $E_2$ and $E_3$ are "conjugate" expressions and so the equations for $E_1$, $E_2$, and $E_3$ become as follows;

(29) $E_1 = r_d - \epsilon(s_d^2/\Delta)\{2(R-S)[(R^2-S^2)^2 - R(2R+S)] + (\delta^3+\delta^{*3})S^2 + 2R\}$

(30) $E_2 = -\delta\epsilon(s_d/\Delta)\{(R-S)^3(R+S) - 2R(R-S) + \delta^{*2}S[1-(R-S)^2] + 1\}$

(31) $E_3 = -\delta^*\epsilon(s_d^2/\Delta)\{(R-S)^3(R+S) - 2R(R-S) + \delta^2 S[1-(R-S)^2] + 1\}$ The conditions for a real ideal circulator circulating clockwise seen in FIGURE 4 with waves being launched into port X are as follows:

$E_1 = 0$
$|E_2| = 1$
$E_3 = 0$

Any of these conditions can be imposed on the Equations 29 to 31 to provide a biquartic algebraic equation for the reciprocal and non-reciprocal phase factors $\epsilon$ and $\delta$ in terms of the T junction scattering coefficients shown in FIGURE 5. For example, setting $E_3 = 0$ and substituting equivalent values for R and S, as set forth in Equations 7 to 11, the following results:

(32) $(r-s)^3(r+s)\epsilon^4 - 2r(r-s)\epsilon^2 - [s(r-s)^2\epsilon^3 - \delta\epsilon]\delta^3 + 1 = 0$ In order to simplify this, let;

(33) $a_4 = (r-s)^2(r^2-s^2)$
(34) $a_3 = -s(r-s)^2$
(35) $a_2 = -2r(r-s)$
(36) $a_1 = s$
(37) $a_0 = 1$

Substituting 33 to 37 in 32 the following results;

(38) $a_4\epsilon^4 + a_2\epsilon^2 + a_0 + (a_3\epsilon^3 + a_1\epsilon)\delta^3 = 0$ The term $\delta$ is a complex number of unit magnitude representing differential phase shift, and, therefore;

(39) $|\delta| = |e^{-i(\phi_+-\phi_-)}| = 1$ and so;

(40) $|\delta|^6 = \left|\frac{a_4\epsilon^4 + a_2\epsilon^2 + a_0}{a_3\epsilon^3 + a_1\epsilon}\right|^2 = 1$ Hence

(41) $|a_4\epsilon^4 + a_2\epsilon^2 + a_0|^2 = |a_3\epsilon^3 + a_1\epsilon|^2$ The absolute squares are expanded to yield the following:

(42) $|a_4|^2 + |a_2|^2 + |a_0|^2 + a_4 a_0^* \epsilon^4 + (a_4 a_2^* + a_2 a_0^*)\epsilon^2 + (a_4^* a_2 + a_2^* a_0)\epsilon^{-2} + a_4^* a_0 \epsilon^{-4}$
$= |a_3|^2 + |a_1|^2 + a_3 a_1^* \epsilon^2 + a_3^* a_1 \epsilon^{-2}$ Multiplying throughout by $\epsilon^4$ and collecting terms yields the biquartic equation for

(43) $A_8\epsilon^8 + A_6\epsilon^6 + A_4\epsilon^4 + A_2\epsilon^2 + A_0 = 0$ where

(44) $A_8 = A_0^* = a_4 a_0^*$
(45) $A_6 = A_2^* = a_4 a_2^* + a_2 a_0 - a_3 a_1^*$
(46) $A_4 = |a_4|^2 + |a_2|^2 + |a_0|^2 - |a_3|^2 - |a_1|^2$

Included below is a chart illustrating a range of feasible combinations of wave coefficients, scattering coefficients of the T junction and the corresponding value of $\phi_+ - \phi_-$ obtained as real solutions of Equation 43.

| Solution | 1 | 2 | 3 | 4 | 5 | 6 | 7 | 8 | 9 | 10 |
|---|---|---|---|---|---|---|---|---|---|---|
| $|D_{21}|$ | 5.85 | 2.88 | 1.82 | 1.25 | 0.875 | 0.598 | 0.336 | 0.386 | 0.257 | 0.189 |
| $|C_{31}|$ | 3.11 | 1.55 | 1.04 | 0.807 | 0.683 | 0.583 | 0.541 | 0.541 | 0.520 | 0.521 |
| $|D_{32}|$ | 3.05 | 1.56 | 1.04 | 0.806 | 0.683 | 0.583 | 0.541 | 0.541 | 0.520 | 0.521 |
| $|C_{23}|$ | 3.05 | 1.56 | 1.04 | 0.806 | 0.683 | 0.583 | 0.541 | 0.541 | 0.520 | 0.521 |
| $|D_{13}|$ | 3.11 | 1.55 | 1.04 | 0.807 | 0.683 | 0.583 | 0.542 | 0.541 | 0.519 | 0.521 |
| $|C_{12}|$ | 5.93 | 3.05 | 2.08 | 1.60 | 1.329 | 1.166 | 1.055 | 1.072 | 1.033 | 1.018 |
| $\phi_+ - \phi_-/2$ | 0.892 | 3.62 | 8.32 | 15.37 | 12.33 | 19.27 | 19.62 | 20.4 | 23.1 | 37.7 |
| $|r|$ | 0.918 | 0.901 | 0.874 | 0.836 | 0.612 | 0.580 | 0.375 | 0.430 | 0.378 | 0.331 |
| $|s|$ | 0.380 | .374 | .365 | .357 | .612 | .580 | .055 | .664 | .681 |
| $|r_d|$ | 0.988 | .951 | .891 | .809 | .707 | .588 | .454 | .477 | .409 | .383 |
| $|s_d|$ | 0.111 | .219 | .321 | .416 | .500 | .572 | .630 | .621 | .645 | .643 |
| $|C_{31}|(\phi_+-\phi_-)/2$ | 2.77 | 5.62 | 8.65 | 12.4 | 8.42 | 11.2 | 10.6 | 11.0 | 12.0 | 19.6 |

The above list of a few of the solutions of Equation 43 illustrates a few general rules which guide the practice of my invention. The solutions from left to right numbered 1 to 10 are for increasing differential phase shift as indicated by the values of $\phi_+ - \phi_-$. The C and D coefficients indicate the relative amplitude of waves in the circular ring and show that amplitude decreases as differential phase shift increases. The magnitude of mismatch of each of the T junctions indicated by the scattering coefficients $r$, $s$, $r_d$ and $s_d$ is quite large as small values of differential phase shift and the junction becomes more closely matched as differential phase shift increases.

Solution 1 describes a circulator employing relatively small ferrite pieces which produce less than two degrees differential phase shift and grossly mismatched T junctions. In fact, reflection of a wave launched into any port of such a T junction is over 90%, and each is electrically symmetrical along the axis of only the external port. Quite clearly such a circulator would be relatively inexpensive to make and require a minimum of apparatus for magnetizing the ferrite pieces.

Solution 10 describes a circulator employing larger ferrite pieces producing about seventy-five degrees differential phase shift and including slightly mismatched T junctions which reflect about one third of wave energy launched into any port but which are each substantially electrically symmetrical along the axis of each of the ports.

The sets of representative solutions exhibited in the chart above have been selected to illustrate the tendency for solutions characterized by small values of $$(\phi_+ - \phi_-)/2$$

to be associated with large magnitudes of the reflection coefficients, $|r|$ and $|r_d|$, and with somewhat larger values of the wave amplitudes $|D_{21}|$ to $|C_{12}|$. From among these solutions one may be singled out as "best," depending on the requirements of the application contemplated. For example, for most applications, it is desirable that the dissipative loss of energy (insertion loss) of the circulator be a minimum. An estimate of the insertion loss may be made (in spite of the fact that in the idealized ring model discussed here dissipative effects have been neglected) by noting that the part of the loss due to dissipation in the ferrite (usually the dominating cause of insertion loss) will depend, among other things, on the amount of differential phase shift required, i.e., $(\phi_+ - \phi_-)/2$ which dictated the amount of ferrite needed, and also on the amplitudes of the waves passing through the ferrite. Thus, choosing $|C_{31}|$ as a typical wave amplitude, we may take the product $|C_{31}| \, (\phi_+ - \phi_-)/2$ as a measure of the loss to be expected. Values of this product are listed at the bottom of the chart. It is a minimum for Solution 1, becomes larger and then remains fairly constant over Solutions 7, 8, and 9, finally rising to a larger value for Solution 10. This suggests that the lowest loss would occur in a circulator designed according to the prescription of Solution 1, in spite of the fact that solutions at this end of the chart have hightly mismatched T junctions which might be expected to be associated with greater losses. The small value of $(\phi_+ - \phi_-)/2$ in Solution 1 would permit the circulator to be very small. Or alternatively, a larger amount of ferrite might be used, but distributed over a greater surface area and length of transmission line so as to dissipate heat more effectively, if the application calls for high average microwave power levels.

FIGURE 1 illustrates a plan view of an embodiment of the invention including external waveguide ports 11, 12, and 13 each connected to T waveguide junctions 14, 15, and 16 which are in turn coupled together to form a waveguide ring loaded between the junctions with bodies of ferrite material such as ferrite body 17 which are magnetized transverse to the axis of the waveguide by, for example, a permanent magnet such as magnet 18. The strength of the magnet and the size, location and quality of the ferrite material and chosen so that waves within the operating frequency of the device experience a nonreciprocal phase shift when conducted through the ferrite. For example, if the waves are conducted in a clockwise direction, phase shift through each of these ferrite bodies is denoted $\phi_+$ and when conducted in a counterclockwise direction, it is denoted $\phi_-$. Thus, the differential phase shift is $\phi_+ - \phi_-$.

Figure 3:
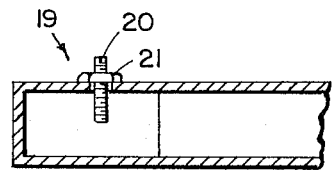

Each of the T junctions 14, 15 and 16 are also equipped with a wave reflector such as 19 including, for example, a post 20 held by a nut 21 fastened to the outside of the waveguide as shown in FIGURE 3. The purpose of each of the posts 20 is to provide the degree of mismatch compatible to the selected values of $\phi_+$ and $\phi_-$ (which are the characteristic parameters of the differential phase shifters) in accordance with the expression set forth in Equation 43. Thus, the posts adjust the scattering coefficients of the T junctions and are preferably adjusted so that the T junctions are electrically identical.

The method of construction of the embodiment in FIGURE 1 includes the steps of selecting the waveguide, the ferrite bodies, and magnet strength to produce an ideal differential phase shifter in view of bandwidth of operation, power, electrical and mechanical and other features bearing on the utilization of the device. Then the proper set of scattering coefficients of the T junction is obtained by adjusting the reflecting posts in unison and when these coefficients satisfy the Equation 43, optimum circulation characteristics are achieved.

Figure 6:
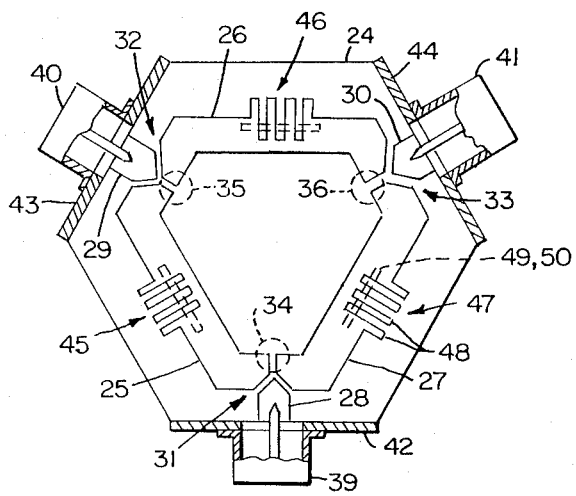
FIGURES 6 and 7 are plan and side views of a strip line circulator including separate differential phase shift sections between ports thereof.
Figure 7:
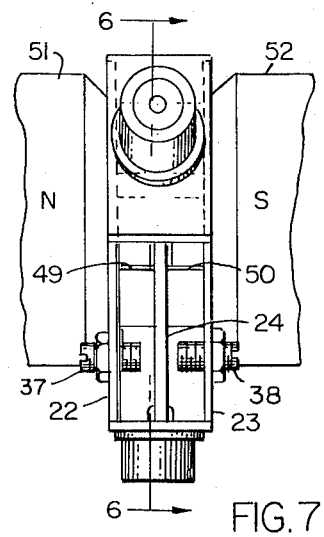

FIGURES 6 and 7 illustrate another embodiment of the invention similar to that in FIGURE 1 but including strip transmission line rather than waveguide. This circulator includes two ground plates 22 and 23 sandwiching a similarly shaped sheet of dielectric 24 therebetween. On opposite sides of the dielectric 24 are formed or fastened thin films of electrically conductive material having the outline shown in FIGURE 6. Identically shaped films of this outline are formed or fastened to each side of the dielectric sheet, sandwiching the sheet therebetween. The film on each side include six sections, three, 25 to 27, forming adjacent arms of two separate T junctions, and a portion of the differential phase shifter therebetween and the other three, 28 to 30, forming a portion of the output ports of the circulator. Thus, each of the T junctions 31 to 33 are formed by three sections of film of conductive material and one of three pairs of tuning posts 34 to 36. For example, junction 31 is formed by the RF coupling between films 25, 27 and 28. The scattering coefficient of T junction 31 is determined in part by the gap between each of these films at the junction and by adjustment of each of the screws 37 and 38 which form tuning post pair 34. The other T junctions 32 and 33 are preferably formed in an identical manner so that the corresponding scattering coefficients of the three junctions are identical. Each T junction couples to an adjacent coaxial connector 39 to 41 supported by transverse plates 42 to 44 located as shown and providing general support for the plates 22, 23 and 24.

The differential phase shifters 45 to 47 each includes a section of delay line comprising a plurality of fingers such as fingers 48 extending from the film strip 27 between the T junctions 31 and 33. The fingers are preferably a quarter wave length long at maximum operating frequency and extend transverse to the general direction of conduction of waves by the strip 27. The mode of propagation by strip 27 in conjunction with the plate 23 and by a corresponding strip on the opposite side of the dielectric plate 24 in conjunction with plate 22, will be TEM mode which generally produces only linearly polarized RF magnetic fields. However, at the base of each of the fingers, between the fingers, circularly polarized RF magnetic fields will be produced because of the occurrence at these points of orthogonally related RF waves in phase quadrature with each other. These circularly polarized RF fields interact with magnetized ferrite bodies such as 49 and 50 located immediately adjacent thereto. Thus, three pairs of such ferrite bodies are provided, one for each of the differential phase shifters 45 to 47, and all are magnetized by magnetic pole pieces 51 and 52. The magnetizing field is chosen to cause an interaction between the circularly polarized RF fields and the magnetic dipoles within the ferrite bodies which is off resonance and results in the absorption of little energy from the RF fields but causes the required differential phase shift $\phi_+ - \phi_-$.

Figure 8:
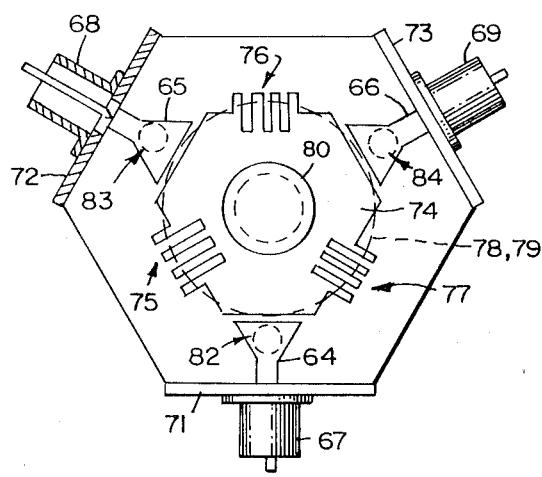
FIGURES 8 and 9 illustrate plan and side views of another strip line circulator in which the phase shift sections all couple to the same ferrite bodies disposed concentric with the axis of the device.
Figure 9:
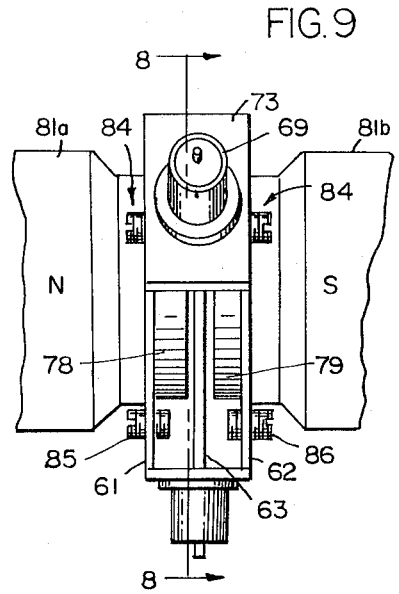

FIGURES 8 and 9 illustrate another embodiment in the invention, including strip transmission line circuits. In this embodiment, differential phase shifters and T junctions are formed in a somewhat different manner than those in FIGURE 6. The device includes two conductive plates 61 and 62 sandwiching a dielectric plate 63 therebetween. To each side of the dielectric plate is affixed, attached, printed, fastened or formed in some suitable manner a thin film of electrically conductive material having the design shown in FIGURE 8. This conductive material includes strip conductors 64, 65, and 66 extending from the center conductors of coaxial connectors 67, 68, and 69 attached to transverse plates 71, 72, and 73 which in turn attach to plates 61 and 62 lending support and rigidity thereto. The conductive films 64 to 66 couple RF energy to a central ring shaped film 74 but are D.C. isolated therefrom. The central film 74 includes sets of fingers 75, 76, and 77 as shown extending generally radially from the center thereof. These fingers perform the same function as the fingers 48 in FIGURE 6 and thus provide the regions of circularly polarized RF magnetic field immediately adjacent the film 74 at the base of the fingers. These circularly polarized fields interact with ferrite bodies 78 and 79 disposed immediately adjacent thereto which are magnetized by the field between pole pieces 81a and 81b of a magnet. The ferrite bodies 78 and 79 are ring shaped, each having a substantial opening such as 80 at the center, which facilitates cooling. This ring-shaped configuration of the ferrite is convenient, however, other configurations could be employed which provide a substantial amount of ferrite material immediately adjacent the base of the fingers which form the delay line sections 75 to 77. For example, three separate pairs of bodies of ferrite could be employed, each pair adjacent a different set of fingers.

In the embodiment shown in FIGURES 8 and 9, the scattering coefficients of the T junctions are formed in part by the gap between films 65, 64 to 66 and the central ring shaped film 74. They are also determined by pairs of reflection posts 82 to 84. The pair of posts 82 includes, for example, screws 85 and 86 threaded to the plates 61 and 62, respectively, and adjustably positioned in the space between the dielectric plate 63 and the plates. The pairs of posts 82 to 84 are not necessarily positioned identically to each other, and may require different adjustment to result in identical sets of scattering coefficients at each of the junctions. This is due to the fact that the effects on scattering coefficient of the gap between the films 64 to 66 and the central film 74 may be slightly different.

The differential phase shift devices described with reference to FIGURES 1, 6 and 8 all include bodies of magnetized ferrite material disposed to intercept circularly polarized magnetic fields of the high frequency waves. The ferrite bodies are magnetized by permanent magnets disposed outside the wave conducting structure. It is well known in the art that the direction of the differential phase shift in such a device can be reversed by reversing the magnetizing field. The simultaneous reversal of magnetization of all differential phase shifters in the circulators shown in these figures would reverse the direction of circulation and so a wave launched into port X in FIGURE 4 would emerge from port Z rather than port Y. Thus, electromagnets could be substituted for the permanent magnets associated with FIGURES 1, 6 and 8 to facilitate magnetization reversal to thereby reverse the direction of circulation.

Another technique for controlling the direction of magnetization of the ferrite bodies is described in my copending U.S. patent application entitled, "A Non-Reciprocal Transmission Device," filed January 27, 1964, Serial No. 340,441. In accordance with this technique the ferrite bodies incur a remanent magnetization by exposure to a steady magnetic field. This remanent magnetization is sufficient to result in a substantial non-reciprocal interaction between the circularly polarized wave fields and the ferrite bodies. The direction of the remanent magnetization is reversed during operation by exposing the ferrite body to a brief pulse of D.C. magnetic field directed oposite to the existing remanence. The pulse of D.C. magnetic field is produced by a pulse of D.C. current passed through the center conductor the strip transmission line into which the ferrite bodies are loaded. This technique could be readily applied to the circulators shown in FIGURES 6 and 8. For example, in FIGURE 6 means could be provided to feed a pulse of D.C. current to each of the film strips 25, 27 and 27 which are the center conductors of strip transmission line sections. The magnetic fields from these current pulses would be sufficient to reverse the remanent magnetization of the ferrite bodies immediately adjacent each strip and, thus, the direction of circulation of the device would be reversed and the external magnet and pole pieces 51 and 52 could be eliminated.

Application of the technique to the embodiment in FIGURE 8 would require that a D.C. discontinuity be made in the ring shaped film 74 so that a pulse of D.C. current could be passed through the ring producing a pulse of D.C. magnetic field to reverse the direction of remanent magnetization of ferrite bodies disposed adjacent thereto.

This completes the description of a few embodiments of the present invention incorporating a plurality of transmission line T junctions interconnected by differential phase shift devices and in which the scattering coefficients of the T junctions and the phase shift characteristics of the differential phase shifters are related by a biquartic equation. More particularly, the biquartic relationship is satisfied by a multitude of combinations of scattering coefficients and differential phase shift which describe circulators incorporating readily obtainable differential phase shift and purposely mismatched T junctions. The various embodiments of the invention described herein are intended to illustrate useful examples of the invention and do not limit the spirit and scope of the invention as set forth in the accompanying claims.

What is claimed is:

1. A high frequency wave conducting device comprising a plurality of multiport junctions each having one external port and means for coupling said junctions together including a plurality of differential phase shift devices and means for producing substantial wave reflection at each of said junctions, whereby transmission between all combinations of two adjacent external ports is substantially nonreciprocal.

2. A high frequency wave conducting device comprising a plurality of T junctions each having one external port, and a plurality of differential phase shift devices coupling said T junctions together and means for producing substantial wave reflection at each of said junctions, whereby transmission between all combinations of two adjacent external ports is substantially nonreciprocal.

3. A high frequency wave conducting device comprising a plurality of transmission line junctions each including two electrically symmetrical ports and one external port, a plurality of identical differential phase shift devices for coupling symmetrical ports of different of said junctions together and means for producing substantial wave reflection at each of said junctions, whereby the scattering coefficients of said junctions and said differential phase shift are selected so that transmission between all combinations of two adjacent external ports is substantially nonreciprocal.

4. A device as in claim 3 and in which said scattering coefficients denoted herein as $r$, $r_d$, $s$ and $s_d$ and said differential phase shift $(\phi_+ - \phi_-)$ and average phase $\phi_+ + \phi_-$) are related by the following expression:

$$+ (r-s)^3(r+s)e^{-2i(\phi_+ + \phi_-)}$$
$$- 2r(r-s)e^{-i(\phi_+ + \phi_-)}$$
$$- [s(r-s)^2 e^{-3i/2(\phi_+ + \phi_-)} - se^{-i/2(\phi_+ + \phi_-)}]e^{-3i/2(\phi_+ - \phi_-)}$$
$$+ 1 = 0$$

said coefficient $r$ being the proportional part of a wave incident upon one of said symmetrical ports which flows from said same symmetrical port, said coefficient $rd$ being the proportional part of a wave incident upon one of said external ports which flows from said same external port, said coefficient $s$ being the proportional part of a wave incident upon one of said symmetrical ports which flows from the opposite symmetrical port, and said coefficient $sd$ being the proportional part of a wave incident upon one of said symmetrical ports which flows from the adjacent external port.

5. A high frequency wave conducting device with at least three ports comprising a plurality of transmission lines each including a different one of said ports and means for conducting waves between said transmission lines, said last mentioned means including a plurality of junctions connected by wave conducting structure loaded with magnetized ferrite material and means for producing substantial wave reflection at each of said junctions, whereby transmission between all combinations of two adjacent of said ports is substantially nonreciprocal.

6. A multiport high frequency wave conducting device with at least three ports comprising a plurality of transmission lines each including a different one of said ports and means for conducting waves between said transmission lines, said last mentioned means including a plurality of T junctions connected by wave conducting structure loaded with ferrite material magnetized substantially transverse to the direction of wave conduction through said structure and means for producing substantial wave reflection at each of said junctions, whereby transmission between all combinations of two adjacent of said ports is substantially nonreciprocal.

7. A multiport high frequency wave circulator with at least three wave transmission ports comprising means for conducting waves between said wave transmission ports, said last mentioned means including a plurality of T junctions interconnected by wave conducting structure loaded with ferrite material magnetized substantially transverse to the direction of conduction of waves through said structures and means for producing substantial wave reflection at each of said junctions.

8. A high frequency wave conducting device comprising a pluraltiy of multiport junctions each having one external port and a plurality of differential phase shift devices coupling said junctions together and means for producing substantial wave reflection at each of said junctions, and the scattering coefficients of said junctions and said differential phase shift are related by a biquartic equation, whereby transmission between all combinations of two adjacent of said ports is substantially nonreciprocal.

9. A high frequency wave conducting device comprising a plurality of substantially electrically identical multiport junctions each having one external port, the same plurality of substantially electrically identical differential phase shift devices coupling said junctions together and means for producing substantial wave reflection at each of said junctions, and the scattering coefficients of one of said junctions and said differential phase shift are related by a biquartic equation, whereby said device performs as a circulator.

10. A high frequency wave conducting device comprising at least three substantially electrically identical T junctions each having one external port, the same plurality of substantially electrically identical differential phase shift devices coupling said junctions together and means for producing substantial wave reflection at each of said junctions, and the scattering coefficients of one of said junctions and said differential phase shift are related by a biquartic equation, whereby said device performs as a circulator.

References Cited by the Examiner

UNITED STATES PATENTS

| | | | |
|---|---|---|---|
| 2,794,172 | 5/1957 | Kock | 333—1.1 |
| 2,840,787 | 6/1958 | Adcock et al. | 333—11 |
| 3,036,278 | 5/1962 | Chait et al. | 333—1.1 |
| 3,174,116 | 3/1965 | Sur | 333—1.1 |
| 3,184,691 | 5/1965 | Marcatili | 333—11 |

OTHER REFERENCES

Grace et al., Three-Port Ring Circulators, Proc. of the IRE, August 1960, pp. 1497, 1498.

HERMAN KARL SAALBACH, *Primary Examiner.*

ELI LIEBERMAN, *Examiner.*

P. L. GENSLER, *Assistant Examiner.*